(12) United States Patent
Burton et al.

(10) Patent No.: US 9,302,689 B2
(45) Date of Patent: Apr. 5, 2016

(54) HAND TRUCK

(75) Inventors: Stewart A. Burton, Milford, CT (US);
David Simonelli, Coventry, RI (US);
Michael O'Hare, Fairfield, CT (US);
David Beckstrom, Roxbury, CT (US);
Albert V. Yannella, Milford, CT (US)

(73) Assignee: Magline, Inc., Standish, MI (US)

( * ) Notice: Subject to any disclaimer, the term of this patent is extended or adjusted under 35 U.S.C. 154(b) by 0 days.

(21) Appl. No.: 13/549,004

(22) Filed: Jul. 13, 2012

(65) Prior Publication Data
US 2013/0181418 A1    Jul. 18, 2013

Related U.S. Application Data

(60) Provisional application No. 61/507,389, filed on Jul. 13, 2011.

(51) Int. Cl.
*B62B 1/12* (2006.01)
*B62B 5/06* (2006.01)
*B62B 5/00* (2006.01)

(52) U.S. Cl.
CPC ............. *B62B 1/12* (2013.01); *B62B 5/0033* (2013.01); *B62B 5/065* (2013.01); *B62B 5/066* (2013.01); *B62B 2203/10* (2013.01); *B62B 2205/33* (2013.01); *B62B 2301/33* (2013.01)

(58) Field of Classification Search
CPC ............ B62B 1/12; B62B 1/04; B62B 1/042; B62B 5/02; B62B 5/026; B62B 5/06; B62B 5/065; B62B 5/066; B62B 2203/10; B62B 2205/33; B62B 2301/33

USPC ......... 280/47.131, 47.17, 47.19, 47.23, 47.24, 280/47.27, 47.28, 47.29, 655
See application file for complete search history.

(56) References Cited

U.S. PATENT DOCUMENTS

| | | | |
|---|---|---|---|
| 2,680,027 A * | 6/1954 | De Puydt et al. | 280/47.28 |
| 3,659,867 A * | 5/1972 | Curry | 280/645 |
| 4,315,632 A * | 2/1982 | Taylor | 280/40 |
| 4,526,399 A * | 7/1985 | Holtz | 280/655 |
| 4,746,141 A * | 5/1988 | Willis | 280/655 |
| 4,960,179 A * | 10/1990 | Leach | 180/8.2 |
| 5,069,466 A * | 12/1991 | Propst | 280/79.3 |
| 5,251,922 A * | 10/1993 | Mann | 280/47.29 |
| 5,885,047 A * | 3/1999 | Davis et al. | 414/490 |
| 6,234,497 B1 * | 5/2001 | Stahler, Sr. | 280/47.29 |
| 6,530,740 B2 * | 3/2003 | Kim | 414/490 |
| 7,980,584 B2 * | 7/2011 | Goldstein | 280/657 |
| 2004/0155418 A1 * | 8/2004 | Middleby | 280/47.29 |
| 2008/0224433 A1 * | 9/2008 | Setzer et al. | 280/47.131 |

* cited by examiner

*Primary Examiner* — Frank Vanaman
(74) *Attorney, Agent, or Firm* — Varnum, Riddering, Schmidt & Howlett LLP

(57) ABSTRACT

A hand truck for carrying and lifting a load comprising spaced vertical columns each having a channel. Rollers are captured in each of said channels that are capable of vertical movement along its respective channel. A first toe plate is affixed to said columns and adapted to extend horizontally during use. A second toe plate is attached to the rollers and adapted to move vertically along said columns between upper and lower positions. The first and second toe plates are in nesting relationship when the second toe plate is in its lower position.

16 Claims, 17 Drawing Sheets

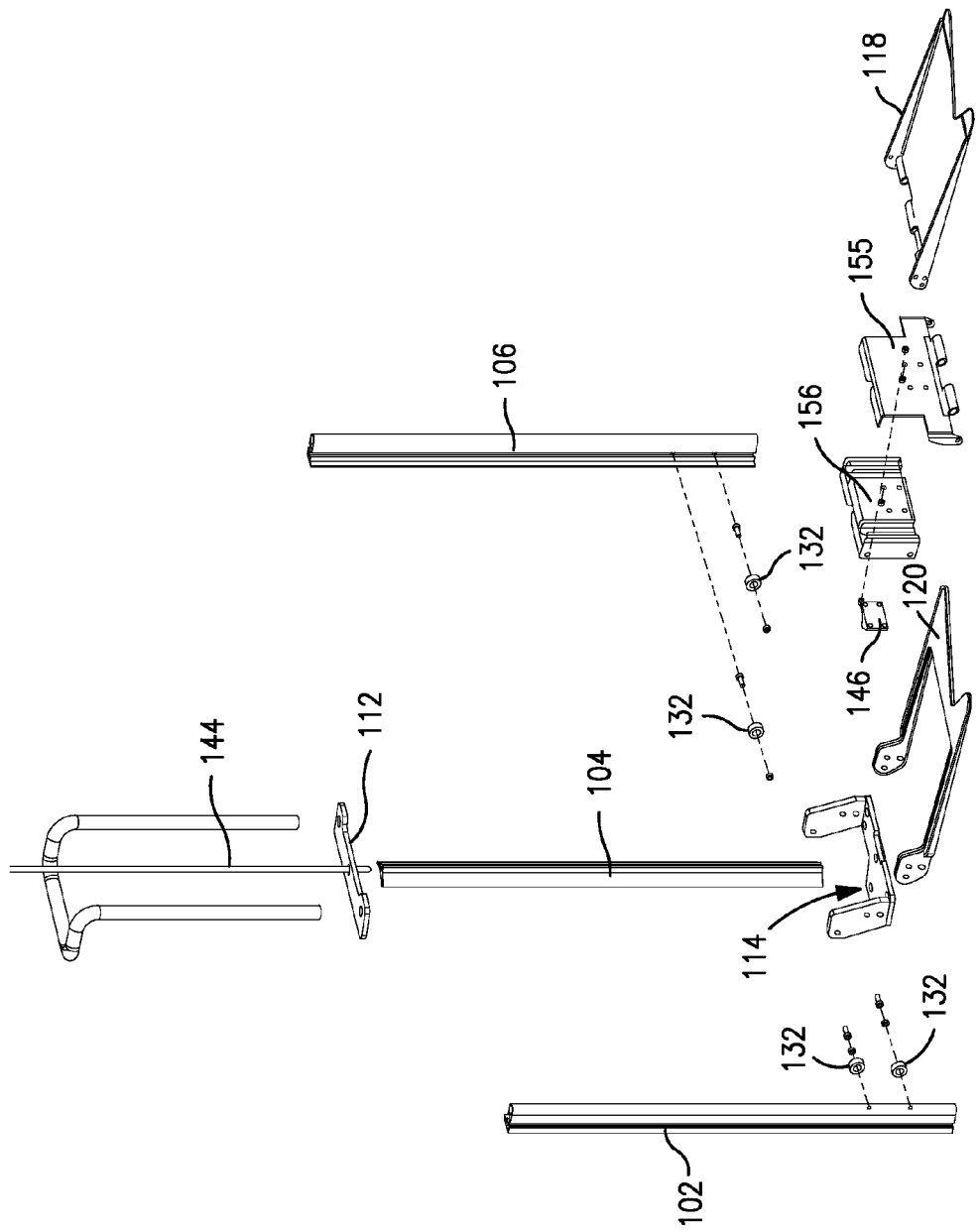

US 9,302,689 B2

HAND TRUCK

CROSS-REFERENCE TO RELATED APPLICATIONS

This application claims the benefit of U.S. Provisional Patent Application No. 61/507,389, entitled "Hand Truck" filed Jul. 13, 2011, the disclosure of which incorporated herein by reference in its entirety.

TECHNICAL FIELD

This application relates to a hand truck and more particularly to a hand truck for transporting and lifting a load.

BACKGROUND

The handling of material in tight spaces required, in many instances, the use of simple hand carts that could not lift, or heavier lifting systems that were expensive and difficult to maneuver. As a result, there is a need for a light and efficient hand truck that can provide for both the moving and lifting of materials that is light in weight, cost efficient and ergonomic.

SUMMARY

According to one aspect of the disclosure there is provided a hand truck for carrying and lifting a load comprising spaced vertical columns each having a channel. Rollers are captured in each of said channels that are capable of vertical movement along its respective channel. A first toe plate is affixed to said columns and adapted to extend horizontally during use. A second toe plate is attached to the rollers and adapted to move vertically along the columns between upper and lower positions; the first and second toe plates are in nesting relationship when the second toe plate is in its lower position.

BRIEF DESCRIPTION OF THE SEVERAL VIEWS OF THE DRAWINGS

FIG. 13 is an isometric exploded view showing how various components of the second embodiment fit together;

DETAILED DESCRIPTION OF THE INVENTION

Figure 1:
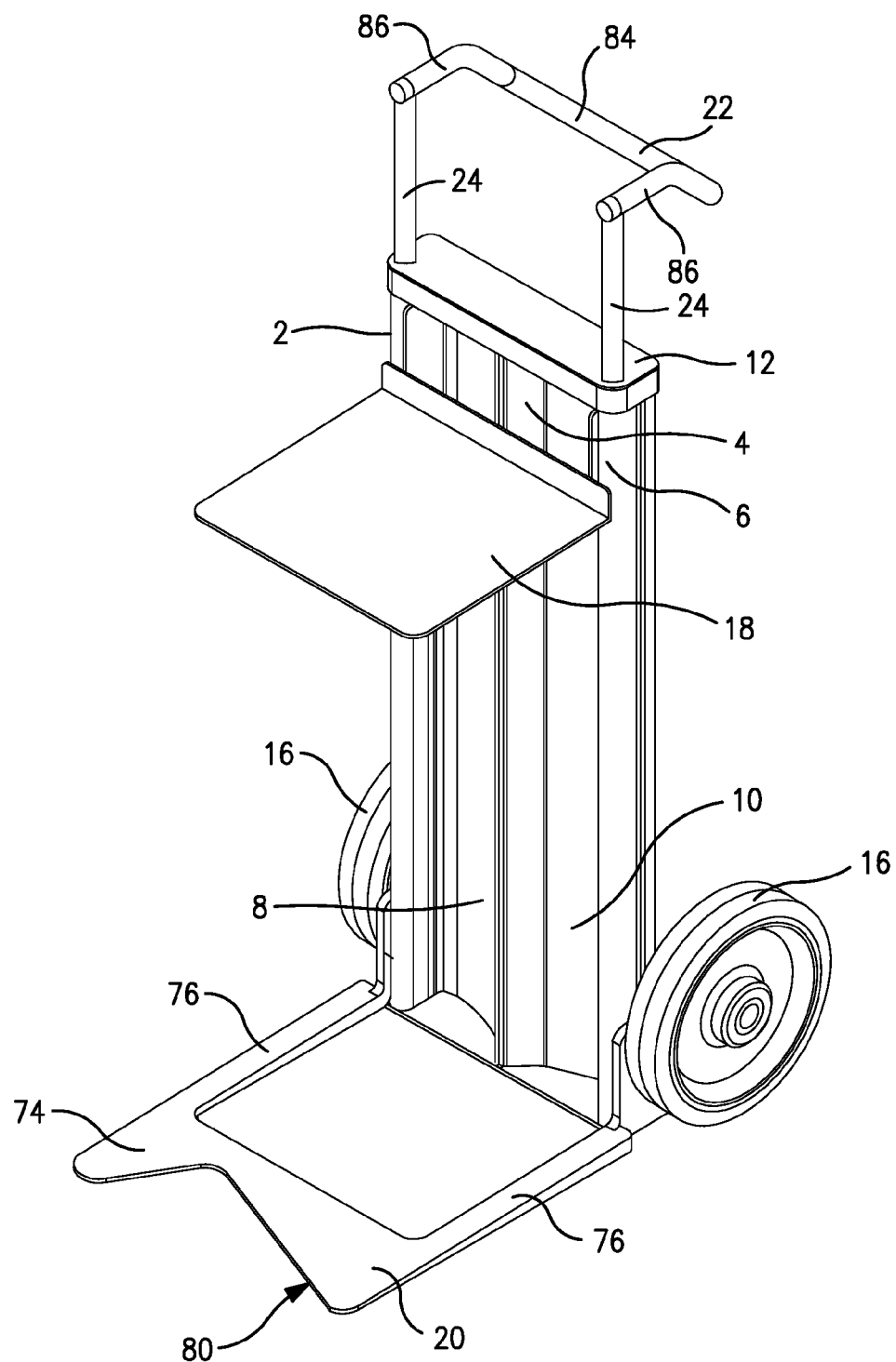
FIG. 1 is a perspective view of the hand truck with the inner toe plate in a raised position.

In general, the hand truck comprises three spaced vertical extending masts or columns 2, 4, 6 aligned in a row. The two outside columns 2 and 6 are mirror images of each other while the center column 4 is of a different structure. The panels 8 and 10 run the entire length of the columns 2, 4 and 6. Two panels 8 and 10 are provided, one on each side of the center column 4 connected between the center column 4 and a respective outside column 2 or 6. A top and bottom cross bracket 12 and 14 interconnects the three columns 2, 4 and 6. Spaced wheels 16 are connected by suitable means to the bottom bracket 14 at the rear of the hand truck as shown.

Figure 2:
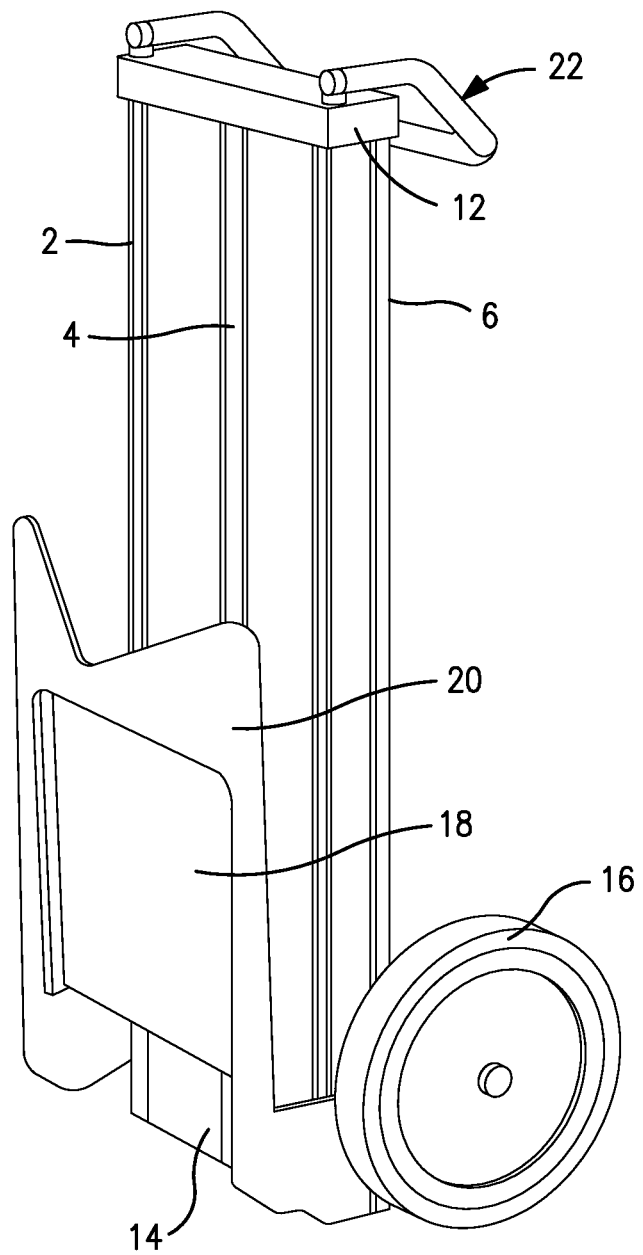
FIG. 2 is a perspective view showing the hand truck in a collapsed position.

The hand truck includes two toe plates, one nesting inside the other, providing an inner toe plate 18 and an outer toe plate 20. When the plates are in the nested position with the inner toe plate 18 in its lower position, the upper surfaces of the two toe plates 18 and 20 are coplanar. The outside toe plate 20 is stationary during use to provide stability while lifting. The inner toe plate 18 provides a lifting platform and is moveable upwardly and downwardly in a vertical direction along the columns 2 and 6. Both the inside 18 and outside 20 toe plates are pivotal upwardly into a collapsed position as shown in FIG. 2 wherein they extend vertically parallel to the elongated columns 2, 4 and 6.

A handle 22 is provided having two elongated vertical posts 24 that extend into the outer columns 2 and 6. The handle 22 is vertically moveable between a raised position as shown In FIG. 1 and a collapsed position as shown in FIG. 2.

Figure 3:
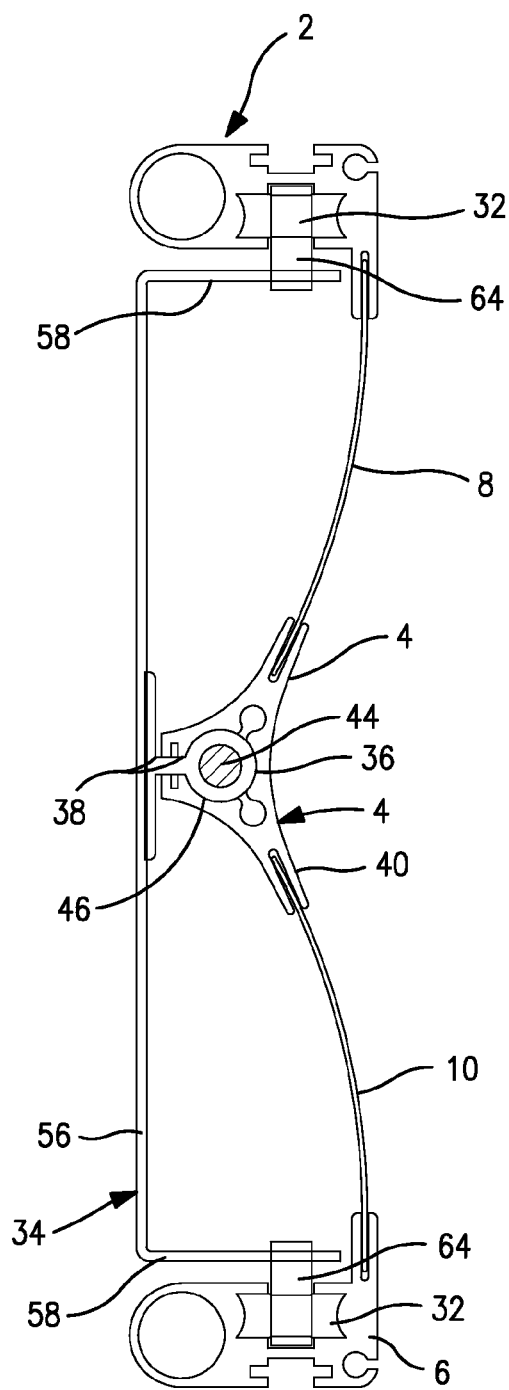
FIG. 3 is a sectional view showing the relationship of the three columns, panels and trolley member.
Figure 4:
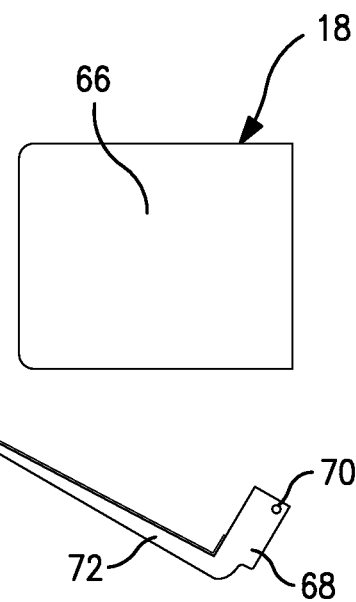
FIG. 4 is a plan view and side view of the center toe plate.
Figure 5:
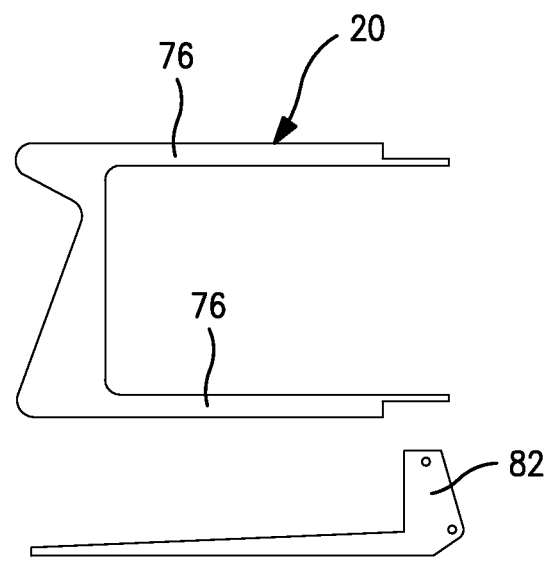
FIG. 5 is a plan view and side view of the outer toe plate.
Figure 7:
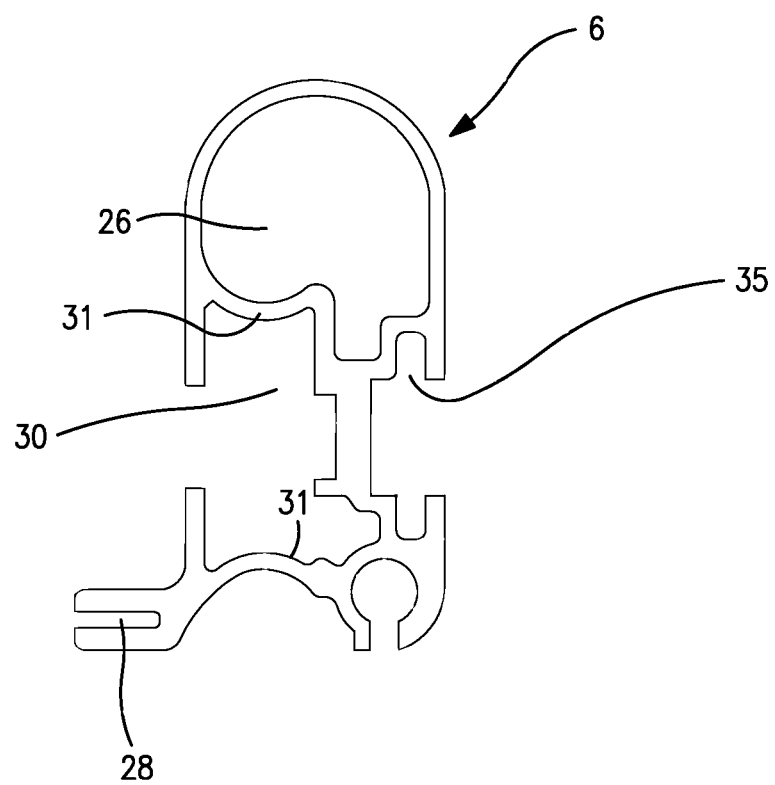
FIG. 7 is a horizontal sectional view through one of the outside masts or column.

More specifically, the outside columns 2 and 6 as shown in FIG. 7 are elongated extrusions and are mirror images of each other. Each column 2 and 6 includes a general circular channel 26 at the rear for receiving the posts 24 of the handle 22. A slot 28, opening to the inside, is provided at the front portion of the columns 2 and 6 to receive the panels 8 or 10. An open channel portion 30 positioned between the circular channel 26 and slot 28 is provided that opens to the inside to capture the rollers 32 of a trolley member 34 as shown in FIG. 3. This portion 30 has opposed convex walls 31 that mate with the concave surfaces 133 of the roller 32. A channel 35 opening to the outside allows for rotation of the toe plates for storage.

Figure 10:
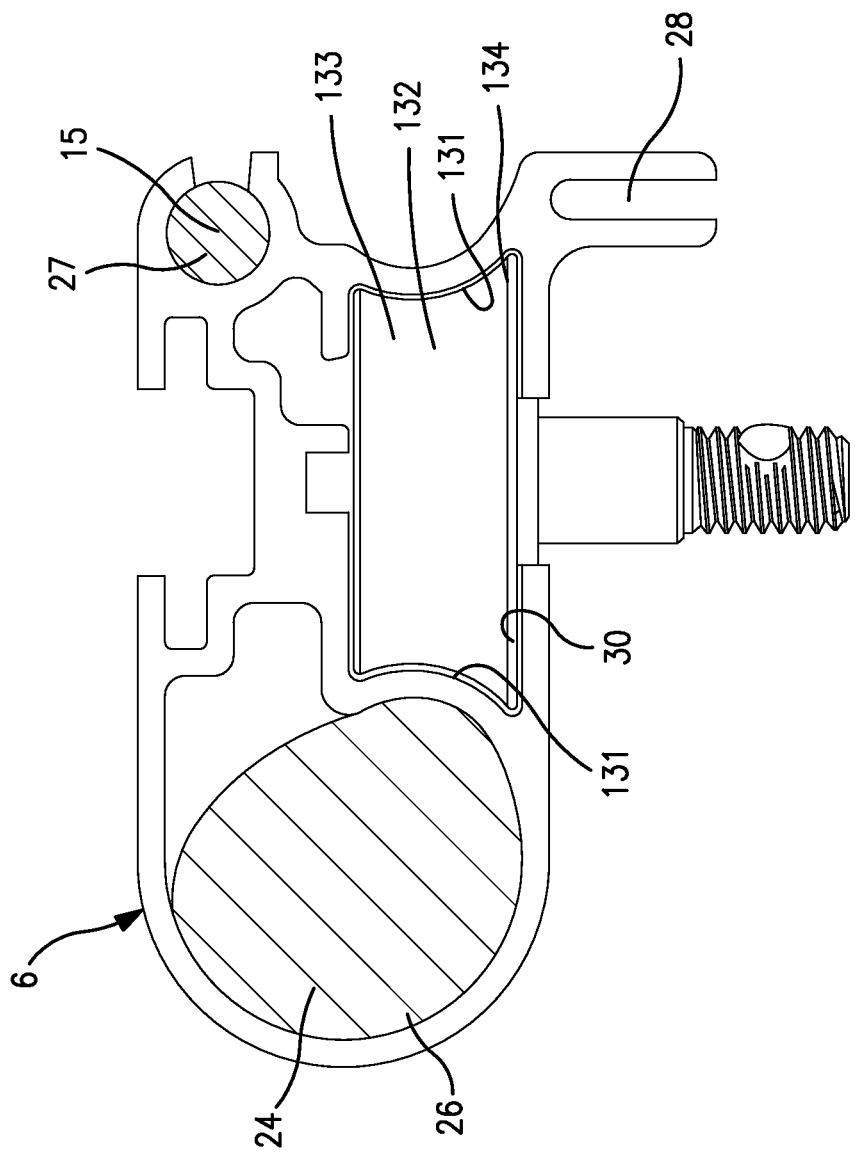
FIG. 10 is a view similar to FIG. 8, but showing an alternative configuration of the channels and rollers.

An alternative arrangement for the channel portion 30 of the columns 2 and 6 containing the rollers 32 is shown in FIG. 10. In this case, each roller 32 has a concave surface 133 that has a greater diameter at its inside edge 134 than at its outside edge 136. The opposed walls 131 of the channel portion 30 of each of the columns 2 and 6 are convex having a mating contour to mate with the outside surface of the roller 32.

The top and bottom cross brackets 12 and 14 are drawn together and held against the ends of the columns 2 and 6 by tension rods 15 extending through bore 27 in each of the outside columns 2 and 6. The rods 15 have threaded ends that extend through the top and bottom cross brackets 12 and 14 and are fastened in tension with suitable nuts.

As shown in FIG. 3, the center column 4 includes a center circular channel 36 having a forward facing slot 38 running the length thereof. Two projections 40 extend rearward toward the outside as shown and are provided with slots 42 to receive the edge portion of a respective panel 8 or 10. As shown in FIG. 3, each panel 8 and 10 extends between the slot 42 in the center column 4 and the slot 28 in a respective outer column 2 or 6.

Figure 9:
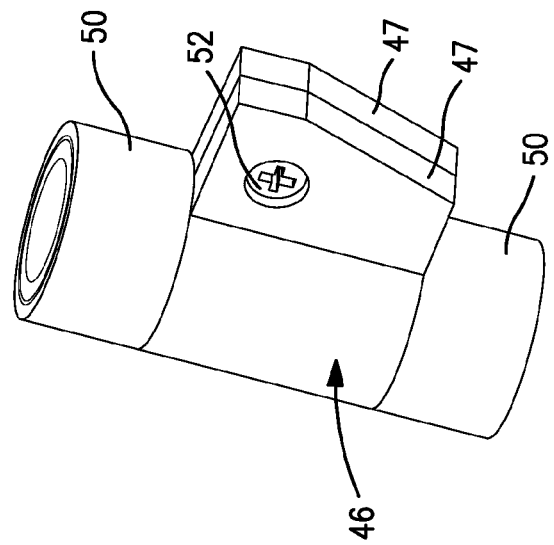
FIG. 9 is an isometric view of the split nut assembly showing it in assembled condition.
Figure 8:
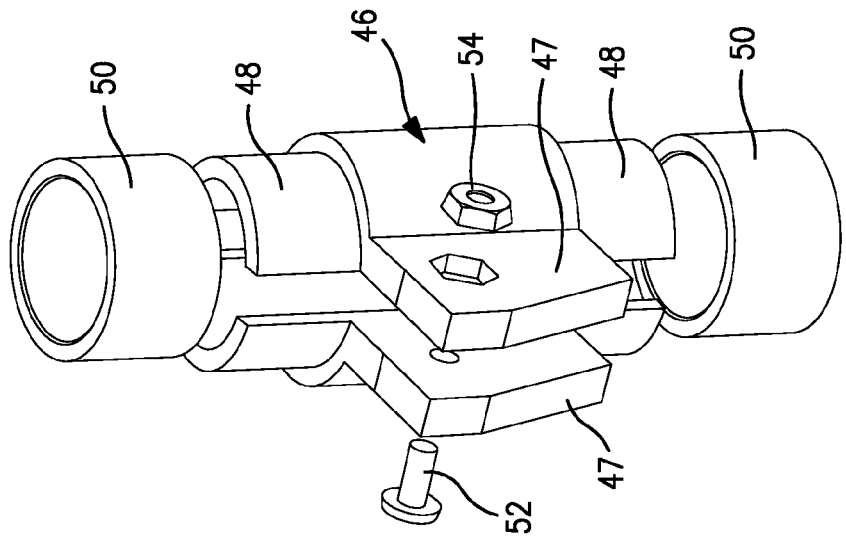
FIG. 8 is an isometric exploded view of the split nut assembly.

A screw member 44, driven by a suitable motor 145 is positioned for rotation in the center circular channel 26 in the center column 4. A connector, shown in FIGS. 8 and 9, includes a split nut 46 positioned in the center circular channel 36 around the screw 44 Each half of the nut has a forward flange portion 47 that extends through the slot 38 and which is connected to the trolley member 34.

Each half of the split nut 46 has a reduced diameter upper and lower portion 48. A nut ring 50 is positioned around the reduced diameter portions 48 to hold the two halves of the split nut 46 together. A bolt 52 and nut 54 secure the two flange portions together as shown. The head of the bolt 52 and nut 54 are countersunk. The nut 46 has internal threads to mate with the threads on the screw shaft 44 so that rotation of the shaft 44 causes the nut 46 to ride up and down on the shaft 44.

The trolley member 34 as shown in FIG. 3 extends between the two outside columns 2 and 6 and includes a front portion 56 with a side flange 58 extending rearward from each end of the front portion 56 as shown in FIG. 3. Each flange 56, has an upper roller 60 and lower roller 62 (as designated in FIG. 6) attached thereto by a shaft 64. The rollers 60 and 62 are contained within the inside open channel portion 30 of a respective one of the outside columns 2 and 6.

The inner toe plate 18 includes a flat lifting platform 66 with spaced upstanding flanges 68 extending to the rear on either side thereof. The flanges 68 have a bore 70 there through adjacent their upper edge through which the shaft 64 of the upper rollers 60 of the trolley member 34 extend. With this arrangement, the inner toe plate 18 is attached to the trolley member 34 while being able to pivot upwardly around the roller shaft 64 into its collapsed position. Downward pivotal movement is limited by a notch 72 on the bottom of the flange 68 that engages the shaft 64 of the bottom rollers 62 of the trolley member 34 when the inner toe plate 18 is in its horizontal position.

Figure 6:
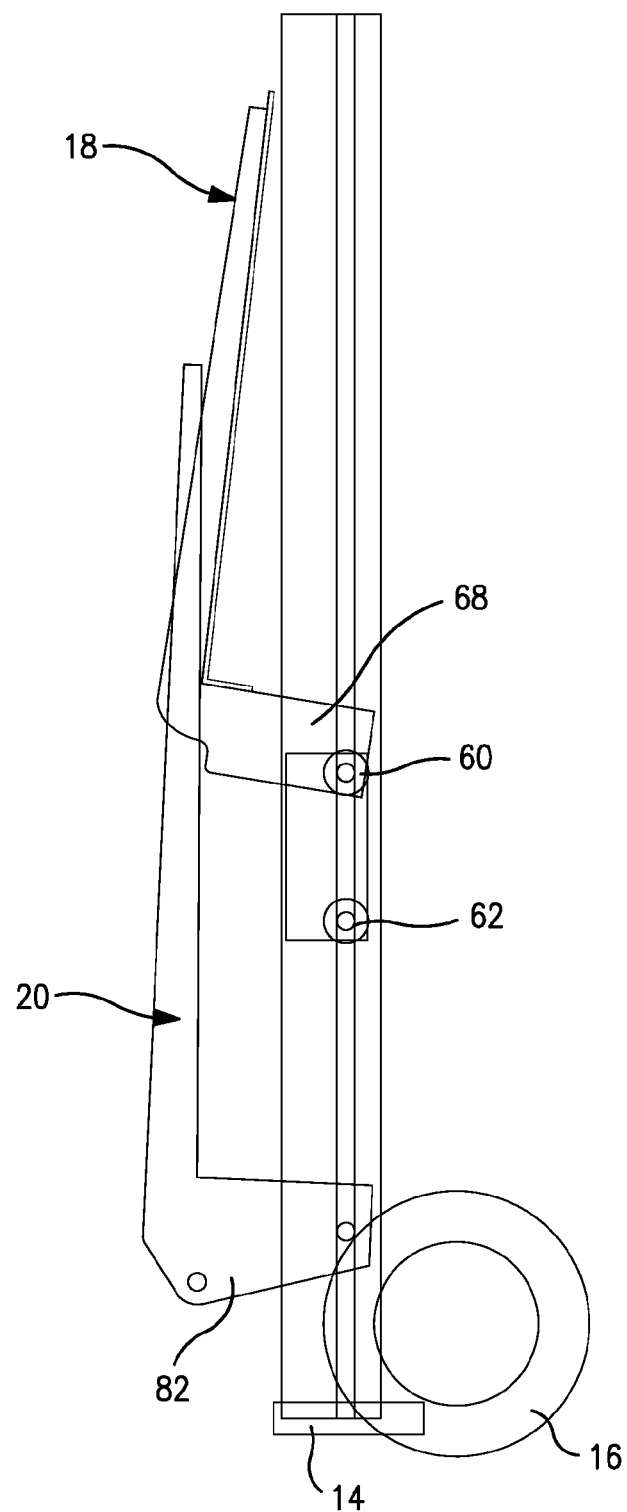
FIG. 6 is a side view showing the toe plates in the collapsed position.

The outer toe plate 70 as shown in FIG. 6 is generally U-Shaped with a forward portion 74 and two legs 76 extending rearward from the sides of the forward portion 74. The forward portion 74 has a planar upper surface that is coplanar with the upper surface of the inner toe plate 18 when the inner toe plate 18 is in its bottom position. The outer toe plate 70 surrounds the inner toe plate 18 on three sides when the inner toe plate 10 is in its bottom position so that the inner toe plate 18 is nested within the outer toe plate 70. The forward edge 78 of the outer toe plate 70 is provided with an L-shaped cutout 80 as shown in FIGS. 1 and 2. This shape enables the outer toe plate 20 to grab the outside corner of a box to make it easier to scoop under the box.

Each leg 76 of the outer toe plate 20 has an upstanding flange 82 at its inner end which is pivotally attached to a respective outer column 2 or 6. A suitable latch mechanism (not shown) latches the outer toe plate 20 in its horizontal position whereby the outer toe plate 20 serves to hold the columns in their upright vertical position and provides stability to the hand truck in the vertical position. Release of the latch mechanism allows the bottom toe plate to be folded upwardly into the vertical position as shown in FIG. 2 for storage.

As shown in FIG. 1, the handle 22 includes a cross member 84 having legs 86 extending forwardly from each end thereof. Each leg 86 is connected to one of the posts 24 that extending vertically downwardly therefrom and which is received in the circular channel 26 in a respective outer column 2 and 6. With this arrangement the handle 24 can be moved upward and downward between an upper position as shown in FIG. 1 and a collapsed position as shown in FIG. 2. A suitable locking mechanism (not shown) may be provided to hold the handle 24 in its various positions.

The drive train includes the screw member 44 contained in the center column 4. A cordless DC rechargeable 14.4 volt battery pack and a suitable motor 145 may be provided and can be mounted on the bottom cross bracket 14. A suitable drive connection, including a gear box may be provided between the motor and screw member 44 to enable the motor to rotate the screw member 44 and move the two-piece nut 46 up and down along the screw member 44. Various controls may also be included including an up/down button which, when depressed, will cause the screw to turn and raise or lower the inner toe plate 18 with the load. Upper and lower limit switches may be provided to shut off the motor when the extreme upper and lower positions of the inner toe plate 18 are contacted.

A suitable brake mechanism, such as shown in U.S. Pat. No. 7,712,682, issued May 11, 2010 to Burton et al., entitled Lifting Device and Method may be provided. The disclosure of this U.S. Pat. No. 7,712,682 is incorporated herein by reference in its entirety.

Preferably, the columns 2, 4 and 6 are each a unitary one-piece structure. The columns 2, 4 and 6 may be extrusions fabricated from aluminum. Other suitable material may be used such as glass, plastic or carbon fiber resin. The panels 8 and 10 may be sheet metal. The panels 8 and 10 may be provided with compartments or other structure to hold accessories such as screwdrivers or other tools.

Figure 11:
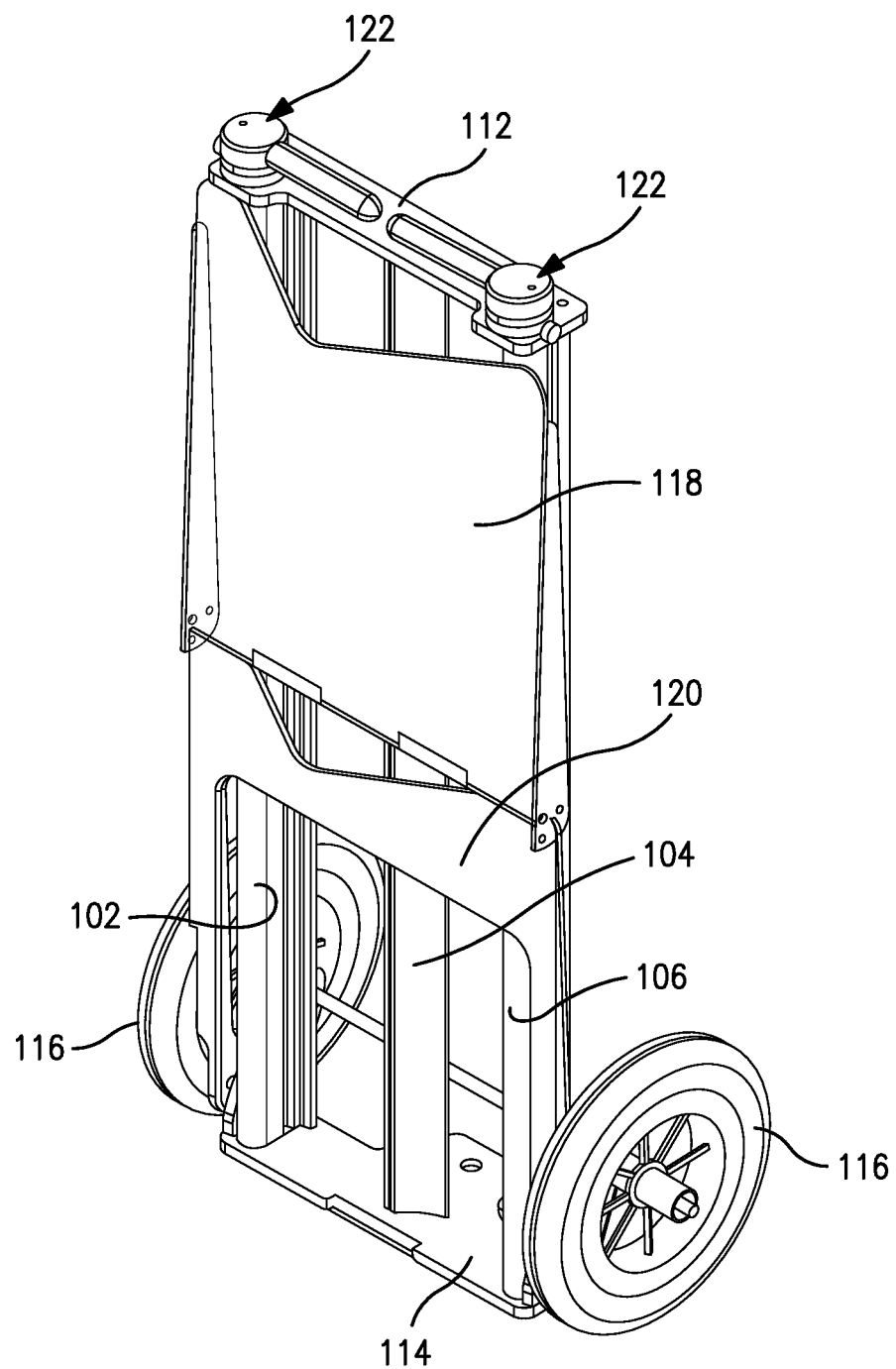
FIG. 11 is a perspective view of a second embodiment of a hand truck in a collapsed position.
Figure 12:
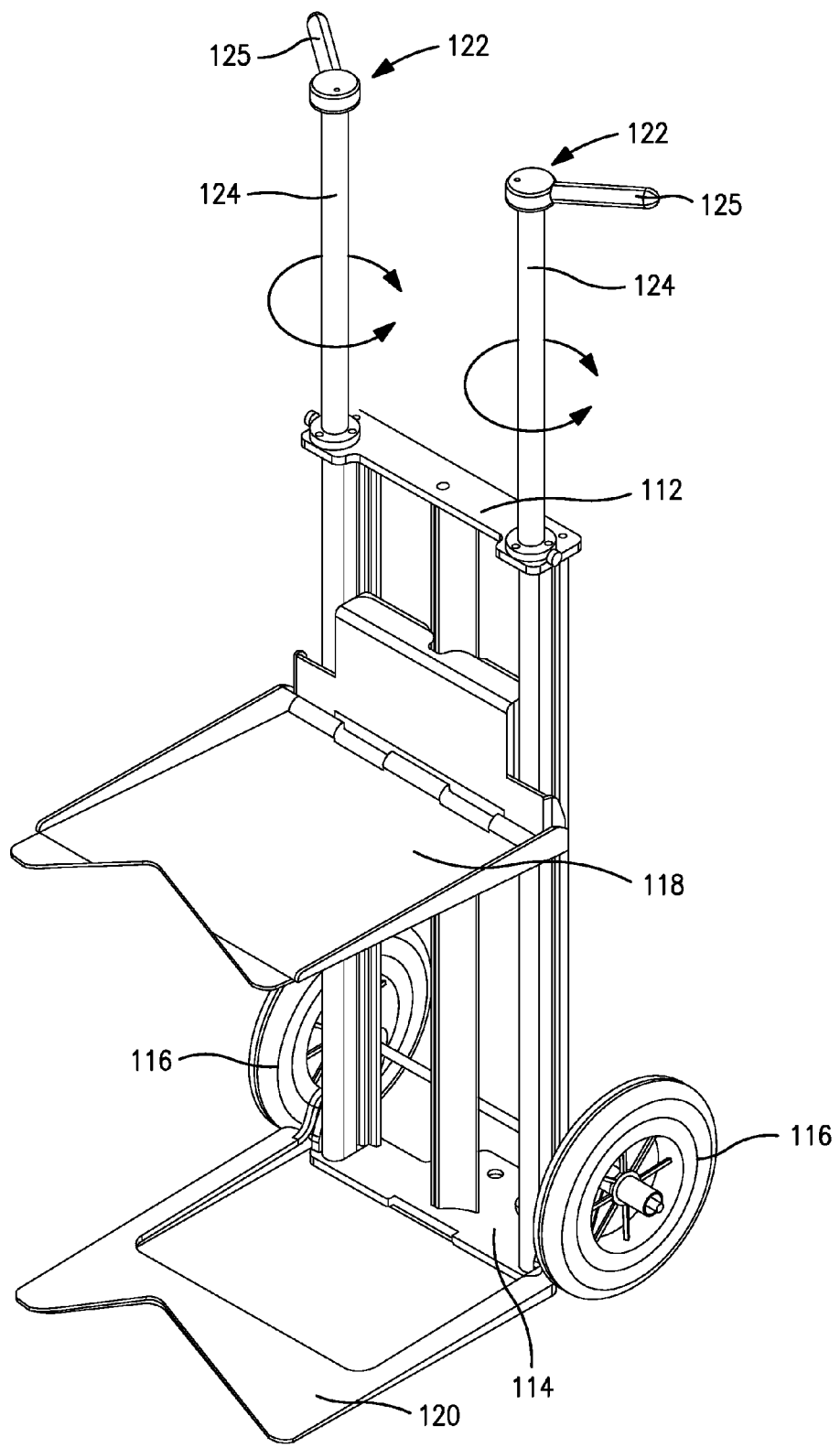
FIG. 12 is a perspective view of the embodiment of FIG. 11 showing the toe plates in the extended position and the handles raised.

A second embodiment of the hand truck is shown in FIGS. 11 and 12. In this embodiment an alternative handle arrangement is provided that comprises two independent handles 122 each having a post 124 mounted in a channel in one of the outside columns 102 or 106. A handle portion 125 is attached to the distal end of each post 124 and extends perpendicular therefrom. Each handle 122 is vertically adjustable between a lower position as shown in FIG. 11 and an upper position as shown in FIG. 12. Each handle 122 is rotatable about the axis of its post 124 as indicated in FIG. 12. Suitable locking mechanisms may be provided to lock each handle in its various positions.

With the alternative handle arrangement, the handles 122 can be set to multiple positions independently. The locking mechanism may include a detent button (not shown) that may be pushed and each handle may be adjusted vertically (up to 24 inches as an example) to a comfortable height for the operator. The adjustable vertical feature can be used when going up or down stairs or for transporting a tall load. Additionally, the handle portions 125 can be rotated and locked pointing away from each other for more torque and stability, or locked at 45 degrees back toward the operator for comfort when transporting loads long distances. The handle portions 125 may be locked pointing toward each other in the case only a single hand is available to grip the handle portions in the center of the hand truck to move the load by a single hand.

This embodiment may have three spaced columns 102, 104 and 106 similar to the previous embodiment. Top and bottom cross brackets 112 interconnect the three spaced columns 102, 104 and 106. Spaced wheels 116 and 118 are connected to the bottom cross bracket to the rear of the hand truck. A suitable motor may be provided motorize the wheels 116 to provide a means for propelling the hand truck. Panels such as panels 8 and 10 shown in FIGS. 1,2 and 3 may be provided in this embodiment, and the tension rods 15 may also be included.

As in the previous embodiment, the hand truck includes two toe plates, an upper toe plate 118 and a lower toe plate 120. The lower toe plate 120 is stationary during use to provide stability while lifting. The upper toe plate 118 provides a lifting platform and is moveable upwardly and downwardly in a vertical direction along the columns 2 and 6. Both the upper toe plate 118 and the lower toe plate 120 are pivotal upwardly into a collapsed position as shown in FIG. 11 wherein they extend vertically parallel to the elongated columns 2, 4 and 6.

As indicated in FIG. 13, the bottom toe plate 120 is attached to the bottom cross bracket 114 by pins and a lock mechanism so that it can be locked in an operational position extending from the columns as shown in FIG. 12 or pivoted and locked in a storage position extending generally parallel to the columns as shown in FIG. 11. The upper toe plate 120 is attached to a lifting toe plate backplate 155 via a hinge with a pin and latch mechanism on the side to permit rotation and locking of the upper toe plate 120 in a storage position as shown in FIG. 11or in an operational position extending from the columns as shown in FIG. 12.

The lifting toe plate backplate 155 is rigidly attached to a yoke 156 to which the rollers 132 are secured. The rollers 132 are mounted in the outer columns 102 and 106 as shown in FIG. 10. The yoke 156 is attached to a lifting bracket 146 which in turn is attached to the lead screw nut 145.

Figure 14A:
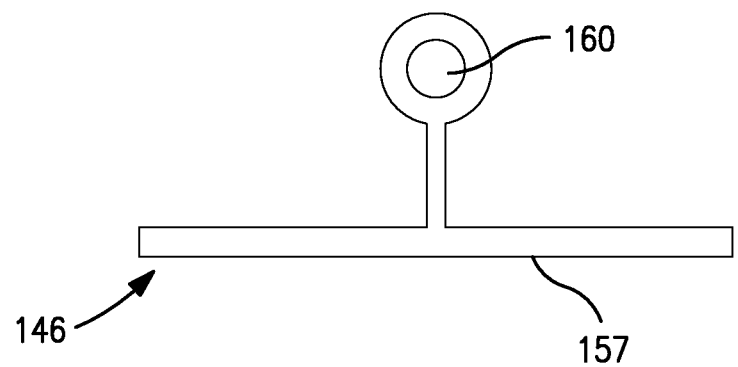
FIG. 14 and FIG. 14A are an isometric view and top view respectively of a lifting bracket.
Figure 14:
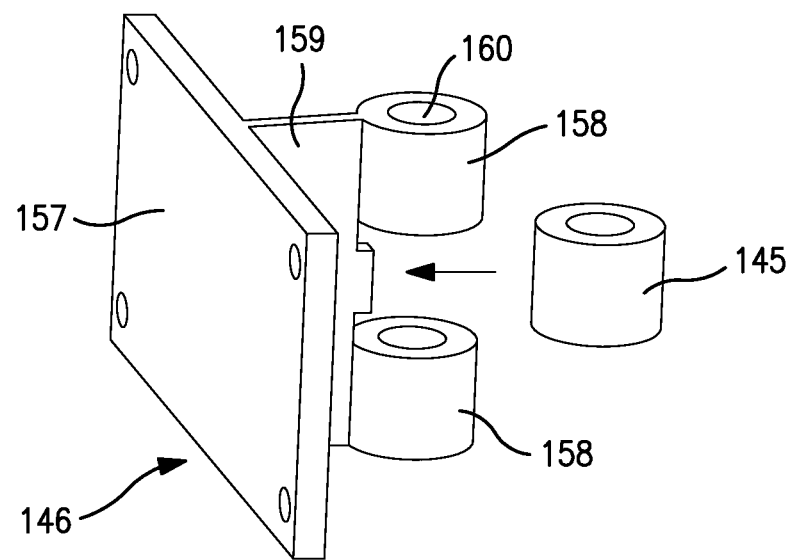

As shown in FIGS. 14 and 14A, the lifting bracket 146 includes a plate portion 157 that is connected to the yoke 156 and two vertically spaced bosses 158 secured to the plate by a rearward extending flange 159. Each boss 158 has a through bore 160 which slidably receives the lead screw 144. The lead screw nut 145, which is threaded on the lead screw 114, is captured between the two bosses 158 so that rotation of the lead screw 144 causes the lead screw nut 145, along with the lifting bracket 146, yoke 156 and upper toe plate 118 to move vertically up and down along the columns 102 and 106.

Figure 15:
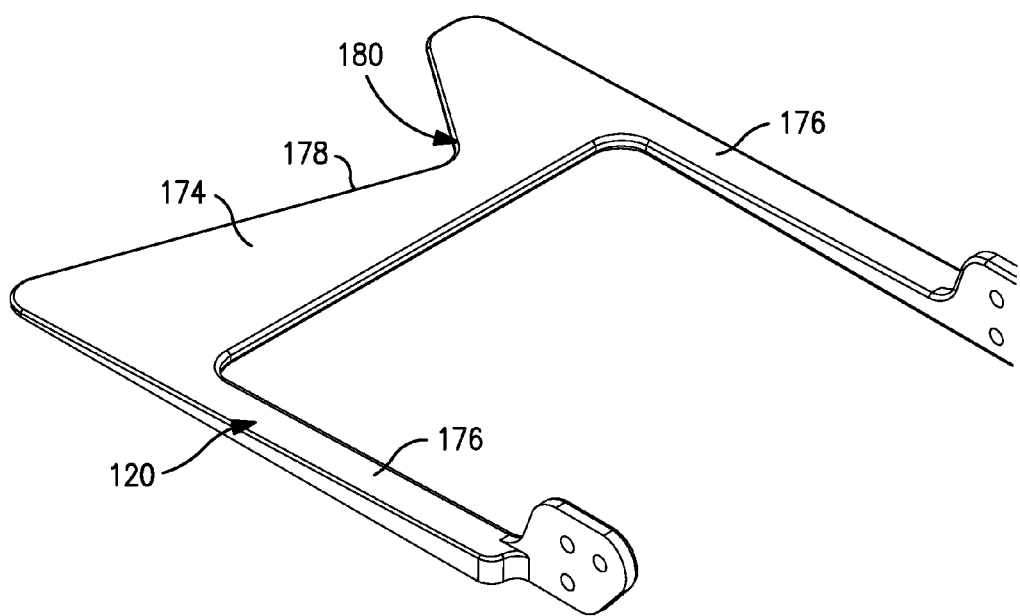
FIG. 15 is an isometric view of the bottom toe plate of the second embodiment.

As shown in FIG. 15 the bottom toe plate 120 is generally U-shaped with a forward portion 174 and two legs 176 extending rearward from the sides of the forward portion 174. The forward edge 178 of the bottom toe plate 120 is provided with an L-shaped cutout 180.

Figure 16:
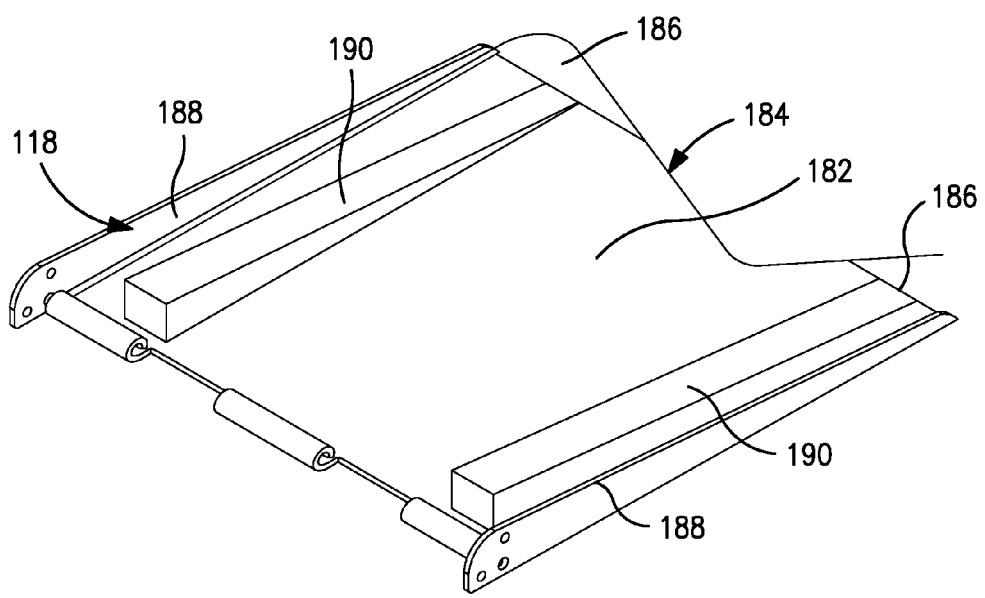
FIG. 16 is an isometric view of the upper toe plate of the second embodiment.

As shown in FIG. 16, the upper toe plate 118 includes a planar portion 182 having a front edge with an L-shaped cutout 184 to match the L-shaped cutout 180 of the bottom toe plate 120. The forward end of the top surface of the planar portion is tapered downwardly and forwardly as indicated at 186. Forwardly and downward tapering sides 188 extend upwardly at both sides of the planar portion 182.

Figure 17:
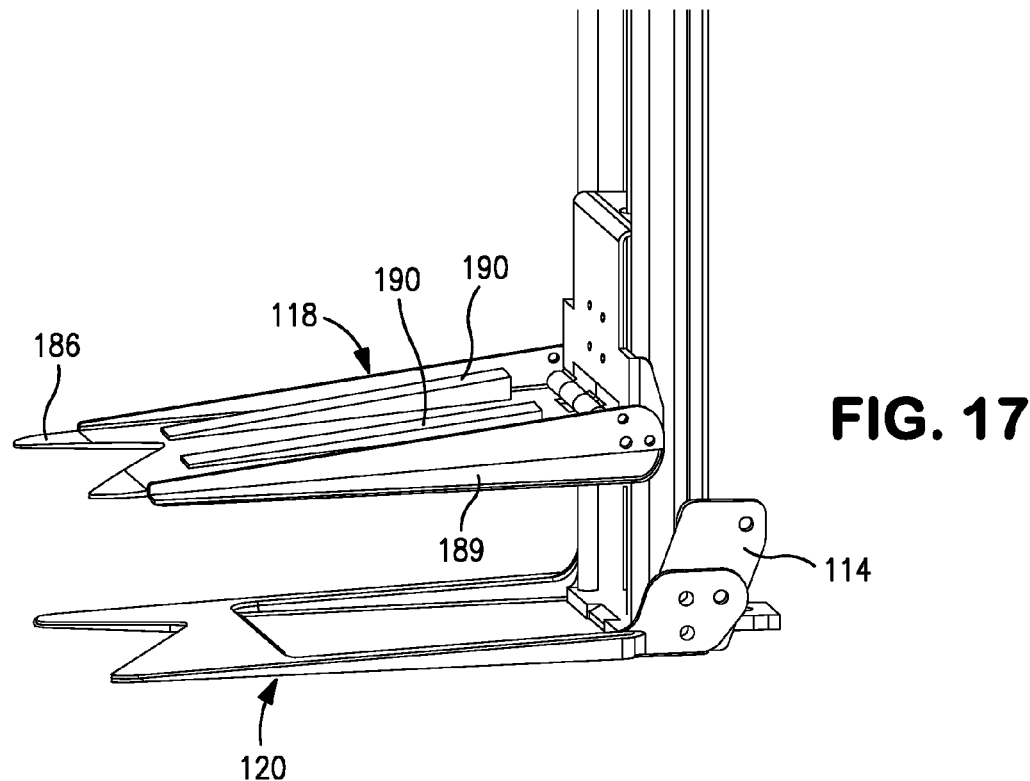
FIG. 17 is an isometric view of the toe plates attached to the hand truck and showing the upper toe plate in a raised position.
Figure 17A:
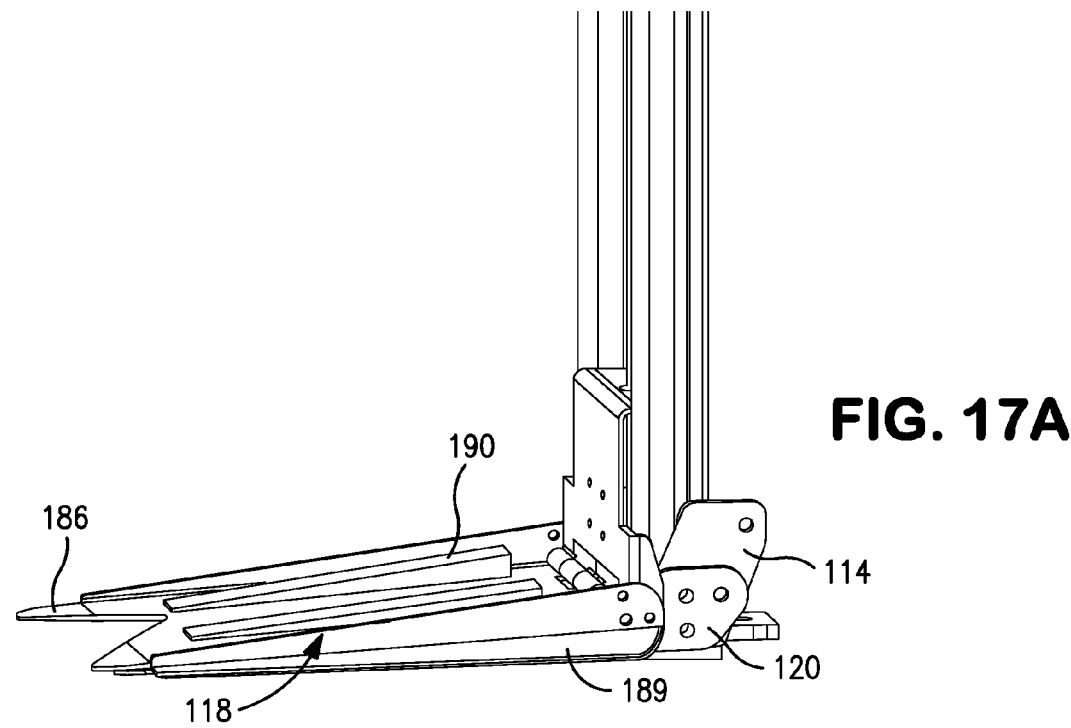
FIG. 17A is an isometric view of the toe plates attached to the hand truck and showing the upper toe plate in its lower position nesting with the lower toe plate.

As shown particularly in FIGS. 17, 17A, a side skirt 189 extends downward from the bottom of the planar portion at either side of the upper toe plate 118. The side skirts 189 are spaced apart a distance such that when the upper toe plate 118 is in its lower position, the bottom toe plate 120 is nested between the side skirts 189 with the side skirts 189 overlapping the side edges of the bottom toe plate 120. The forward end 186 of the upper toe plate 118 may extend forwardly beyond the forward edge of the bottom toe plate 120.

The upper surface of the planar portion of the upper toe plate may be provided with downwardly and forwardly tapering wedges 190 as shown in FIGS. 16 and 17, 17A to assist in the scooping of a load.

Figure 18:
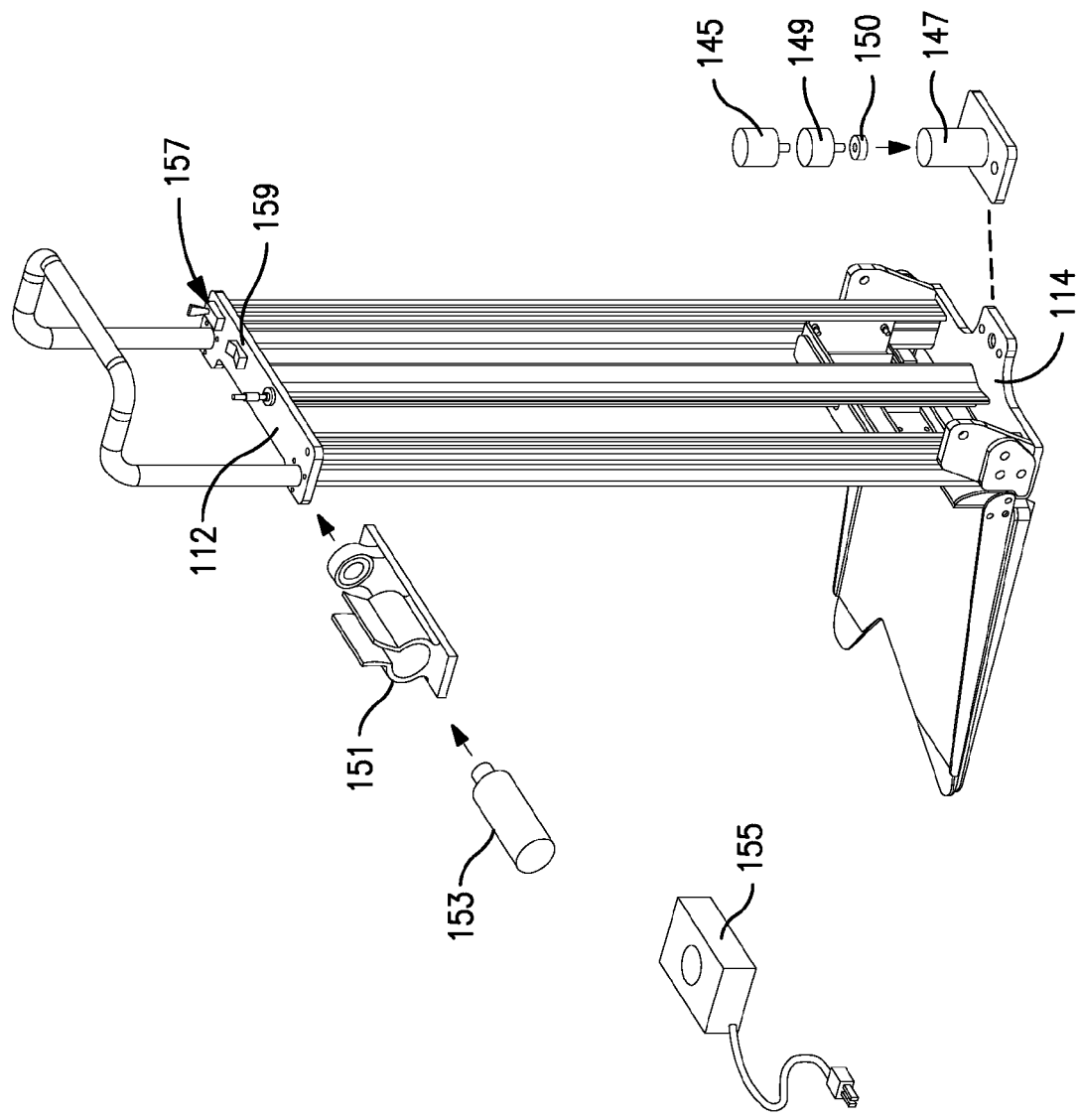
FIG. 18 is an isometric schematic view showing the electrical drive arrangement.

The drive arrangement may include a motor 145 as shown in FIG. 18 mounted on the lower cross bracket 114 by a motor mount 147. The motor 145 is attached to a suitable gearbox 149 that is attached to a clutch 150. The clutch 150 has a shaft protruding through the lower cross bracket 114 that is attached to a gear that is attached to another gear on the lead screw 144.

A removable battery holder 151 is mounted on the upper cross bracket 112 and has mounted therein a rechargeable battery 153 adapted to be recharged by a plug-in battery charging station 155. The battery 153 is wired to a potentiometer trigger 157, an up/down toggle switch 159 and the motor 145, with the wiring, where convenient, passing through the center column 104. The battery 145 may be a rechargeable lithium 18v battery.

In operation, the operator would take the hand truck folded for storage and unlatch the bottom toe plate 120 and upper toe plate 118 from their folded position and rotate them outward until they are locked in their operable position, general perpendicular to the columns 102 and 106. The removable battery 153 would be placed in its holder 151 and, while the up/down toggle switch 159 is set to down, would depress the trigger 157 to start the motor 145 and move the upper toe plate 118 down to its lowest position nesting over the bottom toe plate 120. The operator would then move the hand truck into position using the wheels 116 and ram the tapered front edge of the upper toe plate 118 underneath the load. To lift the load, the operator would lock the wheels 116 in the "parked" mode and change the up/down toggle switch 159 to up. The operator would press the trigger 157 to raise the load until the desired height is reached or until the upper limit is reached and the clutch 150 makes a clicking sound and there is no more vertical movement.

Figure 19:
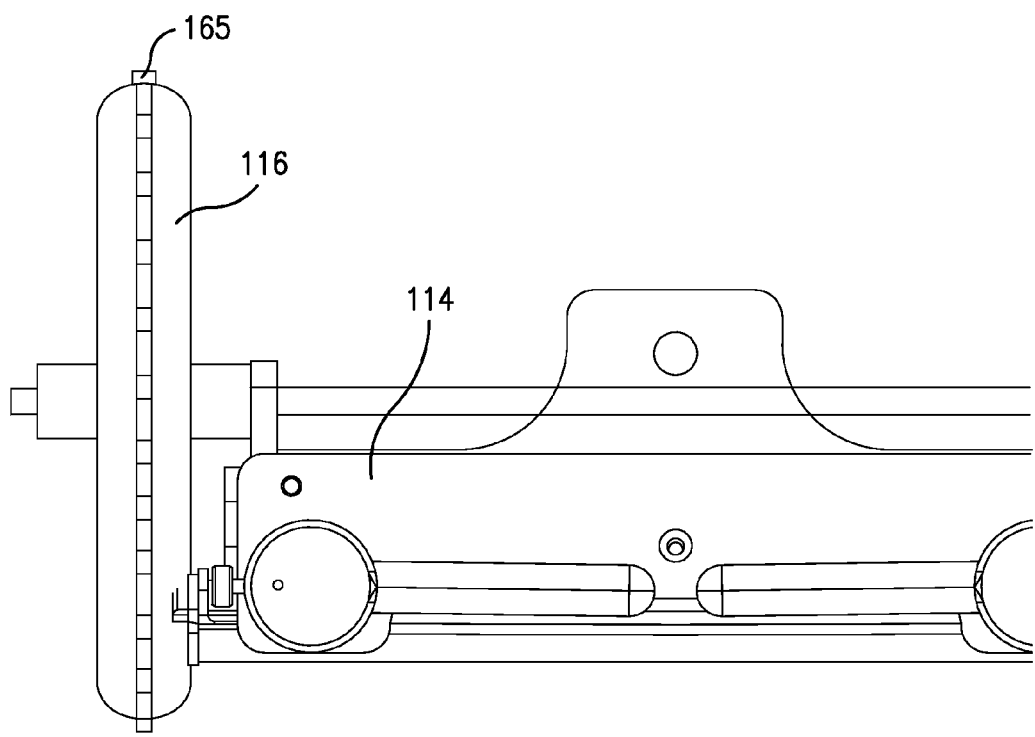
FIG. 19 is a partial isometric view showing one of the wheels of the hand truck.

As shown in FIG. 19, the wheels 116 may have tires provided with cogs 165 around their periphery. The cogs will grip the stair tread to assist the hand truck in climbing stairs.

An inertia brake (not shown) may be provided for catastrophic failure of the nut and lead screw connection. A three axis accelerometer may also be provided with appropriate circuitry to prevent lifting if tipping.

With the above described arrangement, a hand truck is provided that is easy to operate, relatively light in weight, cost efficient and ergonomic.

The invention claimed is:

1. A hand truck for carrying and lifting a load comprising:
    spaced vertical columns each having a channel and a middle column;
    rollers captured in each of said channels capable of vertical movement along a said respective channel:
    a first toe plate affixed to said columns and adapted to extend horizontally during use;
    a second toe plate adapted to move vertically along said columns between upper and lower positions; said first and second toe plates being in nesting relationship with each other when said second toe plate is in its lower position;
    a lifting toe plate backplate, said second toe plate being secured to said lifting toe plate backplate:
    a yoke to which said lifting toe back plate is secured, said rollers extending from said yoke:
    a lead screw received in said middle column,
    a lifting bracket attached to said yoke, said lifting bracket being attached by a nut to said lead screw so that upon rotation of said lead screw, said second toe plate is moved vertically along said columns.

2. The hand truck of claim 1 wherein the first toe plate is generally U-shaped with a forward portion, and two leg portions extending rearward from said forward portion, said forward portion and said leg portions surrounding said second toe plate when said second toe plate is in its lower position.

3. The hand truck of claim 2 wherein said first and second toe plates have upper surfaces that are coplanar when said second toe plate is in its lower position.

4. The hand truck of claim 1 wherein said first and second toe plates are rotatable into a vertical position substantially parallel to said columns for storage.

5. The hand truck of claim 1 wherein said first toe plate has a forward edge provided with an L-shaped cutout.

6. The hand truck of claim 1 wherein said second toe plate has spaced side skirts extending downward from its side edges that cover the side edges of the first toe plate when said second toe plate is in its lower position whereby said first toe plate is nested between said side skirts of said second toe plate.

7. The hand truck of claim 6 wherein the second toe plate has a planar upper surface with a tapered portion at its forward end, said upper surface having at least one wedge thereon that tapers forwardly and downwardly.

8. The hand truck of claim 1 further including a handle having at least one post telescopingly received in one of said spaced columns whereby said handle can be raised and lowered.

9. The hand truck of claim 1 wherein said hand truck includes two independent handles each having a post telescopingly received in one of said spaced columns, each said posts having a handle portion attached thereto, said handles being rotatable about the axis of the post.

10. The hand truck of claim 1 wherein said channels for said rollers have opposed convex walls and said rollers have an outer concave surface mating with said convex walls of said channel.

11. The hand truck of claim 10 wherein one edge of each roller has a diameter larger than the diameter of the other edge and the convex walls have a contour to mate with the contour of the outer surface of said roller.

12. The hand truck of claim 1 wherein said center column is positioned centrally between the two spaced vertical columns and panels, one on each side of said center column are positioned between the center column and a respective spaced vertical panel.

13. The hand truck of claim 1 further including top and bottom cross brackets at the top and bottom of said columns, and tension rods extending through a channel in said columns and holding the top and bottom cross brackets against said columns.

14. The hand truck of claim 1 further including top and bottom cross brackets secured to the top and bottom of said columns respectively, and further including wheels attached to said bottom cross bracket for moving said hand truck, said wheels having tires with cogs.

15. The hand truck of claim 1 further including top and bottom cross brackets secured to the top and bottom of said columns respectively, and further including a motor secured to said bottom bracket.

16. The hand truck of claim 15 further including a rechargeable battery wired to said motor, an up/down toggle switch, and a potentiometer trigger.

* * * * *